United States Patent

Saito et al.

[11] Patent Number: 5,866,648
[45] Date of Patent: Feb. 2, 1999

[54] LONG FIBER-REINFORCED POLYMER ALLOY RESIN COMPOSITION

[75] Inventors: Koichi Saito; Takashi Shimpuku; Rikio Yonaiyama, all of Ichihara, Japan

[73] Assignee: Chisso Corporation, Osaka, Japan

[21] Appl. No.: 600,967

[22] PCT Filed: Jun. 7, 1995

[86] PCT No.: PCT/JP95/01130

§ 371 Date: Feb. 12, 1996

§ 102(e) Date: Feb. 12, 1996

[87] PCT Pub. No.: WO95/34598

PCT Pub. Date: Dec. 21, 1995

[30] Foreign Application Priority Data

Jun. 13, 1994 [JP] Japan ................................. 6-154192

[51] Int. Cl.$^6$ .................................................. C08L 77/00
[52] U.S. Cl. .......................... 524/494; 524/504; 524/514; 524/847; 525/66; 525/69; 525/71; 525/74; 525/78; 525/178; 525/184
[58] Field of Search ................................. 525/66, 71, 69, 525/74, 78, 178, 184; 524/494, 514, 504, 847

[56] References Cited

U.S. PATENT DOCUMENTS 4,613,647   9/1986  Yonaiyama et al. .................... 524/514
4,657,952   4/1987  Kerschbaumer et al. .............. 523/351

OTHER PUBLICATIONS

JP 03239754 A Abstract, Oct. 25, 1991.

JP 05112657 A Abstract, May 7, 1993.

*Primary Examiner*—Mark L. Warzel
*Attorney, Agent, or Firm*—Leydig, Voit & Mayer

[57] ABSTRACT

A long fiber-reinforced polymer alloy resin composition (C) is provided which is obtained by blending a master batch (A) containing a long fiber reinforcement (a2) having a length of 3 to 30 mm in a resin matrix of a polyamide resin (a1), with a substantially polymer-alloyed resin diluent (B) obtained by melt kneading 45 to 20% by weight of a crystalline polyolefin resin (b1) and 55 to 80% by weight of a polyamide resin (b2), the crystalline polyolefin resin (b1) containing a modified olefin crystalline polymer (b11) having been substantially modified with unsaturated carboxylic acids. In this resin composition (C), the amount of the long fiber reinforcement (a2) is in the range of 10 to 60% by weight, and the amount of the crystalline polyolefin resin (b1) in resin components ((a1)+(b1)+(2)) other than the long finer reinforcement (a2) is in the range of 20 to 45% by weight. This resin composition (C) is excellent in tensile strength and particularly excellent in repeated impact resistance properties.

9 Claims, 1 Drawing Sheet

LONG FIBER-REINFORCED POLYMER ALLOY RESIN COMPOSITION

TECHNICAL FIELD

The present invention relates to a long fiber-reinforced polymer alloy resin composition which is suitable for injection molding and is excellent in dispersibility of the long fiber reinforcement in the molded article produced therefrom and excellent in the reinforcing effect exerted by the long fiber reinforcement, mechanical strength, especially tensile strength and flexural strength, and repeated impact resistance properties.

BACKGROUND ART

The "long fiber-reinforced polyamide resin composition" is obtained by, for example, impregnating a reinforcing long fiber bundle with a molten polyamide resin. Reinforced molded articles obtained from the long fiber-reinforced composition exhibit prominently improved impact resistance as compared with conventional short fiber-reinforced molded articles. The reason is presumably that the long fiber-reinforced composition (pellet) contains reinforcing fibers having a length substantially equal to that of the pellet. Because of its excellent properties, the long fiber-reinforced polyamide resin composition has been widely used.

However, the polyamide resin is desired to be further improved in lightweight properties, hygroscopicity and cost performance (because of its high cost), though it has high heat resistance. In addition thereto, the polyamide resin is unexpectedly brittle when repeatedly subjected to shock (that is, poor in repeated impact properties), though it is good in ordinary impact resistance. Therefore, the use of the polyamide resin composition is specifically limited.

In this connection, Japanese Patent Laid-Open Publication No. 58458/1985 proposes a composition comprising a specific modified polypropylene a specific polyamide and a fiber reinforcement. It is described in this publication that a composition which has heat resistance almost equal to that of polyamide and is highly improved in lightweight properties, hygroscopicity and cost performance can be obtained according to this invention. However, a means to prepare the composition disclosed in the publication is only a method of melt kneading a resin and preliminarily chopped glass fibers by an extruder or the like. According to the additional tests, molded articles obtained from the composition is entirely insufficient not only in repeated impact resistance properties but also in impact resistance.

The present inventors have already invented a novel long fiber-reinforced resin composition, that comprises a resin matrix of a "polymer alloy" made from a polyamide resin and a modified olefin crystalline polymer prepared by graft modification with unsaturated carboxylic acids, particularly, a modified propylene crystalline polymer, to which long fiber reinforcement is homogeneously added. According to this invention, there can be obtained a long fiber-reinforced resin composition which is excellent in lightweight properties, cost performance and ordinary impact resistance and, moreover is remarkably improved in repeated impact resistance.

In fields where much higher performance is required for molded articles produced from long fiber-reinforced compositions, however, there is room for improvement in the dispersibility of the long fibers in the molded articles to thereby enhance mechanical properties such as tensile strength. Further, the glass fiber reinforcement in the form of small bundles remains in the molded articles because of lack of loosening of bundles, and, thefore, the molded articles sometimes have bad appearance. Furthermore, there remains room for further improvement in repeated impact resistance of the molded articles.

As another prior art technique, a resin composition comprising a thermoplastic resin containing fibers (first resin) and other resin (second resin) having a melting point lower than that of the first resin has been proposed in Japanese Patent Publication No. 60780/1993. In this publication, it is described that the second resin is melted prior to melting of the first resin and includes the first resin. Therefore, folding of the fibers is inhibited by the first resin, and as a result, the molded article can be improved in mechanical strength, rigidity and heat resistance. According to the studies by the present inventors, however, the degree of the improvement in the mechanical strength of the molded article is still insufficient, though the folding of the fibers in the molded article is undoubtedly improved (reduced). Further, the repeated impact resistance is never improved, though the ordinary impact resistance is improved.

As is apparent from the above, a fiber-reinforced resin composition showing high dispersibility of fibers in the molded article and excellent in all of the lightweight properties of the molded article, cost performance, mechanical strength and the repeated impact resistance properties has been eagerly desired, but no satisfactory fiber-reinforced resin composition has been obtained yet. Accordingly, it is an object of the present invention to provide a fiber-reinforced composition excellent in these properties.

DISCLOSURE OF THE INVENTION

Under such circumstances as mentioned above, the present inventors have found that a novel long fiber-reinforced resin composition (C) obtained by blending a master batch of long fiber-reinforced resin (A) containing a polyamide resin (a1) as a resin matrix with a specific polymer-alloyed resin diluent (B) to thereby make the components contained in a specific ratio, is excellent in the mechanical strength such as tensile strength of its molded article, and is excellent in repeated impact resistance. As a result of further studies by the present inventors, the present invention has been accomplished. The present invention resides in the following items.

(1) A long fiber-reinforced polymer alloy resin composition (C) obtained by blending:

a master batch (A) containing a long fiber reinforcement (a2) having a length of 3 to 30 mm in a resin matrix of a polyamide resin (a1); and a substantially polymer-alloyed resin diluent (B) obtained by melt kneading 20 to 45% by weight of a crystalline polyolefin resin (b1), said crystalline polyolefin resin (b1) comprising a modified olefin crystalline polymer (b11) having been modified with unsaturated carboxylic acids (b12), and 55 to 80% by weight of a polyamide resin (b2);

in which the amount of the long fiber reinforcement (a2) is in the range of 10 to 60% by weight, and the amount of the crystalline polyolefin resin (b1) in resin components ((a1)+(b1)+(b2)) than the long fiber reinforcement (a2) is in the range of 20 to 45% by weight.

2) The long fiber-reinforced polymer alloy resin composition (C) according to above item (1), wherein the resin diluent (B) is composed of 60 to 75% by weight of the polyamide resin (b2) and 20 to 40% by weight of the crystalline polyolefin resin (b1), the total amounts of said components (b1) and (b2) being 100% by weight.

3) The long fiber-reinforced polymer alloy resin composition (C) according to the above item (1) and the above item (2), wherein the long fiber reinforcement (a2) is at least one inorganic fiber selected from the group consisting of a glass fiber, rock wool, a metallic fiber and a carbon fiber, and/or at least one fiber selected from the group consisting of all aromatic polyamide fibers and all aromatic polyester fibers.

(4) The long fiber-reinforced polymer alloy resin composition (C) according to the above items (1), (2) and (3), wherein the long fiber reinforcement (a2) is a glass fiber.

(5) The long fiber-reinforced polymer alloy resin composition (C) according to the above items (1), (2), (3) and (4) wherein the resin diluent (B) is composed of 60 to 75% by weight of the polyamide resin (b2) and 20 to 40% by weight of a crystalline polypropylene resin (b1) containing a modified propylene polymer (b11), the total amounts of said components (b1) and (b2) being 100% by weight.

BEST MODE FOR CARRYING OUT THE INVENTION

Figure 1A:
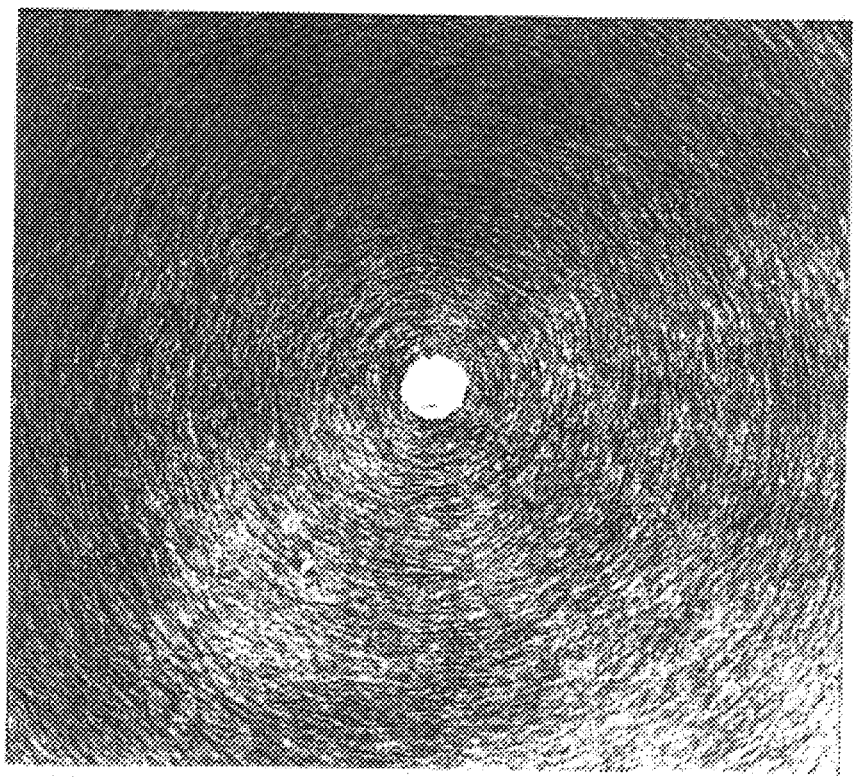
FIG. 1A is a soft X-ray photograph of an injection molded flat sheet obtained from the long fiber-reinforced polymer alloy resin composition of the present invention.

The long fiber-reinforced polymer alloy resin (C) according to the invention is obtained by blending a specific master batch (A) and a specific resin diluent (B), both of which are described in detail hereinafter.

Master batch (A)

The master batch (A) (sometimes referred to as "component (A)" hereinafter) used in the invention comprises a polyamide resin (a1) as a resin matrix (sometimes referred to as "resin matrix (a1)" or "polyamide resin matrix (a1)" hereinafter) and a long fiber reinforcement (a2).

The polyamide resin (a1) used as a base of the resin matrix is concretely exemplified as follows. As a matter of course, the polyamide resin (a1) employable in the invention is not limited to the examples below.

Ring-opening addition polymerization type resins: polyamide-6, (PA 6), polyamide-11 (PA 11) and polyamide-12 (PA 12);

Co-condensation polymerization type resins: polyamide-6,6 (PA 66), polyamide-6,10 (PA610), polyamide-6,12 (PA 612) and MXD 6 (prepared from m-xylenediamine and adipic acid);

Composites (Hybrids) of the above resins, such as polyamide-6/polyamide-6,6 co-condensate; and mixtures of the above resins.

Of the above resins, preferred polyamide resins (nylons) are polyamide-6 and polyamide-6,6 from the viewpoint of good balance between heat resistance and mechanical strength. For uses where compatibility with the later-described resin diluent (B) and low water absorption property (water resistance) are regarded as important, polyamide-11, polyamide-12, polyamide-6,10, polyamide-6,12 and MXD 6 are preferred. For uses where heat resistance (heat distortion temperature) is regarded as important, MXD 6 is preferred.

As the long fiber reinforcement (a2) which is blended with the resin matrix (a1) to allow the long fiber-reinforced resin composition of the invention to have excellent tensile strength and repeated impact resistance, various fibers described below can be properly employed. That is, any of inorganic fibers and organic fibers may be used as the long fibers of the long fiber reinforcement (a2). Examples of the inorganic fibers include glass fiber, rock wool, metallic fiber and carbon fiber. Examples of the organic fibers include all aromatic polyamide fibers (e.g., Aramid (trade name)) and all aromatic polyester fibers (e.g., Kevlar (trade name)).

These long fibers can be used in the form of a monofilament, but in many cases they are used in the form of a roving or end obtained by bundling a large number of monofilaments using a binder.

The long glass fiber, that is most generally used as the reinforcement among the above-mentioned long fibers, is described below. Also other long fibers can be used in a similar manner to that of in glass fiber except the special cases.

The glass long fiber reinforcement employable in the invention may be an ordinary glass roving, that is supplied to reinforce resins. The roving suitably used in the invention has a mean fiber diameter of 6 to 30 $\mu$m and a bundle of 500 to 6,000 monofilaments, and preferably has a mean fiber diameter of 9 to 23 $\mu$m and a bundle of 1,000 to 4,000 monofilaments. Two or more of the glass rovings doubled may be used depending on the application. The length of the fibers in the long fiber-reinforced pellet (A) used in the invention is almost equal to the length of the pellet, because the long fiber-reinforced pellet is obtained by cutting a reinforced strand which is formed by pultrusion of an endless fiber bundle.

For preparing the master batch (A) composed of the resin matrix (a1) and the long fiber reinforcement (a2), that is, a long fiber-reinforced resin composition which contains the resin matrix (a1) in a higher concentration than the final concentration, the following processes (or apparatuses) known as "pultrusion processes (or apparatuses)" can be employed without limitation.

A molten polyamide resin (a1) and a long fiber reinforcement (a2) of the roving type (long fiber bundle) are fed to a crosshead die in such a manner that the feed direction of the long fiber reinforcement crosses the direction of the molten polyamide resin (a1). The long fiber reinforcement (a2) is then allowed to meander through plural barriers or metallic bars which are arranged in parallel with each other and at regular intervals from each other along the flow path of the long fiber reinforcement (a2). The long fiber reinforcement (a2) is loosened when it is brought into contact with the barriers or the metallic bars, and the fibers thus loosened are impregnated with the molten resin, followed by taking up the resultant strands. After cooling, the strands are pelletized into pellets having a length of 3 to 30 mm, preferably 6 to 25 mm, more preferably 9 to 20 mm. The length of the pellet is equal to the length of the long fiber reinforcement (a2), as described above.

It is preferred to avoid use of extremely short pellets, i.e., reinforced pellets having a mean pellet length of less than 3 mm. The reason is that the degree of improvement of the molded articles formed from the pellets having a mean length of less than 3 mm is small in any of the physical properties including mechanical strength, impact resistance and repeated impact resistance properties. Also the use of extremely long pellets having a mean pellet length of more than 30 mm is preferably avoided, because when they are used, the bite of the screw into the pellets having been fed through the hopper tends to become lower in the ordinary injection molding machine and moreover, separation between the pellets and the diluent resin often takes place in the hopper.

Resin diluent (B)

The resin diluent (B) used in the invention has been substantially polymer-alloyed, and is obtained from a specific crystalline polyolefin resin (b1) and polyamide (b2).

The crystalline polyolefin resin (b1) comprises a modified olefin crystalline polymer (b11). In the invention, the entire crystalline polyolefin resin (b1) may be the modified olefin crystalline polymer (b11).

In more detail, the modified olefin crystalline polymer (b11) has been substantially modified with an unsaturated carboxylic acid or its anhydride or derivative (sometimes generically referred to as "unsaturated carboxylic acids" hereinafter) serving as a modifier. The modified olefin crystalline polymer having been substantially modified with unsaturated carboxylic acids may be a single substance of a modified propylene crystalline polymer obtained by graft reaction of a crystalline polyolefin resin with a modifier, or may be a mixture of the modified propylene crystalline polymer and an unmodified crystalline polypropylene resin.

Examples of polymers used as bases for the modified olefin crystalline polymer (b11) include polyethylene, polypropylene, poly-1-butene and poly-4-methyl-1-pentene. Of these, particularly preferred is polypropylene. The olefin polymer used as a starting material of the modified crystalline olefin polymer (b11) or used as the unmodified olefin crystalline polymer is preferably a crystalline homopolymer or a crystalline copolymer of two or more olefins.

Examples of the unsaturated carboxylic acids serving as modifiers include at least one of acrylic acid, methacrylic acid, maleic acid, itaconic acid, tetrahydrophthalic acid, norbornenedicarboxylic acid, and at least one of anhydrides of these acids such as maleic anhydride, itaconic anhydride, tetrahydrophthalic anhydride and norbornenedicarboxylic anhydride. Of these, maleic anhydride is most preferred from the viewpoint of practical performance. Derivatives of these acids are also employable. The graft reaction of the olefin crystalline polymer with the modifier is preferably carried out in the presence of a radical initiator.

In the resin diluent (B), any modified olefin crystalline polymer (b11) may be used so long as it is substantially chemically reacted with the polyamide resin (b2) so as to be polymer-alloyed. The modified olefin crystalline polymer (b1) may be another modified olefin crystalline polymer having been modified with unsaturated carboxylic acids than the aforesaid graft modified olefin crystalline polymer, e.g., an ionomer resin, or it may be a polymer having, in addition to the carboxyl group, a group which is another polar group than the carboxyl group and is able to be linked to at least one of the amino group and the carboxyl group.

In the modified olefin crystalline polymer (b11) in the invention, the units of the unsaturated carboxylic acids (modifiers) grafted to the olefin crystalline (co)polymer (b1) (i.e., base of the modified olefin crystalline polymer) are contained in an amount of usually 0.01 to 1% by weight, preferably 0.05 to 0.5% by weight.

As the polyamide resin (b2) used for forming the resin diluent (B), various polyamides exemplified above for the resin matrix (a1) are employable. It is preferred to use the same polyamide resin as the polyamide resin (a1) of the resin matrix (a1).

In the present invention, the crystalline polyolefin resin (b1) and the polyamide resin (b2) are melt kneaded to substantially form chemical linkage between the modified propylene crystalline polymer (b11) and the polyamide resin (b2), whereby a polymer-alloyed resin diluent is obtained. The expression "to substantially form chemical linkage" means that an experimental result in which the ratio of the boiling xylene extraction residue in the product is higher by a significant difference than the ratio of the polyamide resin (b2) added to the sum of (b1)+(b2) is observed.

This phenomenon indicates that the polypropylene molecules are not extracted and still remain owing to the occurrence of a chemical linkage between the polypropylene molecules and the polyamide molecules. In other words, because of the chemical linkage between the modified propylene crystalline polymer and the polyamide resin, the modified propylene crystalline polymer comes to be hardly extracted.

The polymer-alloyed resin diluent (B) can be also prepared by another process comprising melt kneading the crystalline polyolefin resin (b1), the unsaturated carboxylic acid (preferably maleic anhydride) as the modifier and the polyamide resin (b2) together to substantially form a chemical linkage between the modified polyolefin crystalline polymer (b11) and the polyamide resin (b2) to such a degree that the above-described phenomenon is experimentally observed.

In the polymer-alloyed resin diluent (B), the crystalline polypropylene resin (b1) is contained preferably in an mount of 20 to 45% by weight. The amount of not more than 15% by weight should be avoided, because the repeated impact properties of the molded article obtained from the final composition are reduced (see: Comparative Example 2). The lowering of the repeated impact properties is presumably caused by the amount of the crystalline polypropylene resin (b1) being smaller than the lower limit.

On the other hand, the amount of the crystalline polypropylene resin (b1) contained in the polymer-alloyed resin diluent (B) exceeding 45% by weight should be also avoided, because the mechanical strength and the repeated impact properties are lowered even if the amount of the component (b1) contained in the final composition is within the range defined by the invention. That is, even if the amount of the component (b1) in the final composition is within the range defined by the invention, the fact that the amount of the crystalline polypropylene resin (b1) is more than 45% by weight means that the amount exceeds 50% by volume.

As a result, it is presumed that the crystalline polypropylene resin (b1) contributes to the matrix phase and the polyamide resin [(a1)+(b2)] contributes to the disperse phase to form two phase (sea-island) structure consisting of an island of the polyamide resin in the polypropylene resin matrix. For this reason, the melting point of the polymer-alloyed resin diluent (B) becomes equal to the melting point of the crystalline polypropylene resin (b1) which forms the resin diluent, and consequently folding of the long fibers can be undoubtedly inhibited in the molding process as described in Japanese Patent Publication No. 60780/1993.

However, the above-mentioned component ratio makes it difficult to prepare a uniform polymer alloy from the polyamide resin (al) serving as the resin matrix in the master batch, the polyamide resin (b2) for forming the resin diluent (B) and the modified propylene crystalline polymer (b11), so that the molded article obtained from the final composition (c) is barely improved in mechanical strength and repeated impact resistance properties.

Long fiber-reinforced polymer alloy resin composition (C)

The long fiber-reinforced polymer alloy resin composition (C) of the invention is prepared by diluting the master batch (A) with the polymer-alloyed resin diluent (B). Specifically, the composition (C) can be prepared by dry blending pellets of both components. Further, it is also possible that the strands of the master batch (A) formed by the aforesaid pultrusion are coated with the polymer-alloyed resin diluent (B) by means of extrusion coating and then pelletized.

The dilution should be carried out in such a manner that the amount of the fiber reinforcement (a2) contained in the final composition (C) is in the range of 10 to 60% by weight and the amount of the crystalline polypropylene resin (b1) contained in other resin components [(a1)+(b1)+(b2)] other than the fiber reinforcement (a2) in the final composition is in the range of 20 to 45% by weight. If the amount of the crystalline polypropylene resin (b1) is not more than 17% by weight (Comparative Example 7) or more than 45% by weight, the mechanical strength and the repeated impact resistance are lowered. Therefore, such case should be avoided. It is unfavorable that the amount of the fiber reinforcement (a2) is not more than 5% by weight, because a satisfactory reinforcing effect cannot be given to the molded article (Comparative Example 6). It is also unfavorable that the amount of the fiber reinforcement (a2) is not less than 70% by weight, because the reinforcing effect given to the molded article gets saturated, resulting in economical disadvantages. Moreover, the amount of the crystalline polypropylene resin (b1) is relatively reduced, resulting in lowering of the repeated impact resistance properties.

For molding the long fiber-reinforced polymer alloy resin composition of the invention into various articles, injection molding is optimum. In the injection molding, a screw having a L/D (ratio of screw length (L) to screw diameter (D)) of about 8 to 25 and a compression ratio of about 1.5 to 2.5 is used.

When injection molding under the above conditions, the effects sought in the present invention can be sufficiently attained, that is, the long fibers can be highly dispersed in the molded article, and the molded article can be sufficiently improved in tensile strength and repeated impact strength (impact times in the durability test).

EXAMPLE (1) Dispersibility of long fibers in molded article

The resin composition was injection molded into a flat sheet, and the state of long fibers dispersed in the flat sheet was observed by means of soft X rays. The results are classified into the following groups.

AA (good): The long fibers are well dispersed and no bundle of long fibers is found.

BB (bad): The long fibers are locally present and a large number of long fiber bundles are found.

Figure 1B:
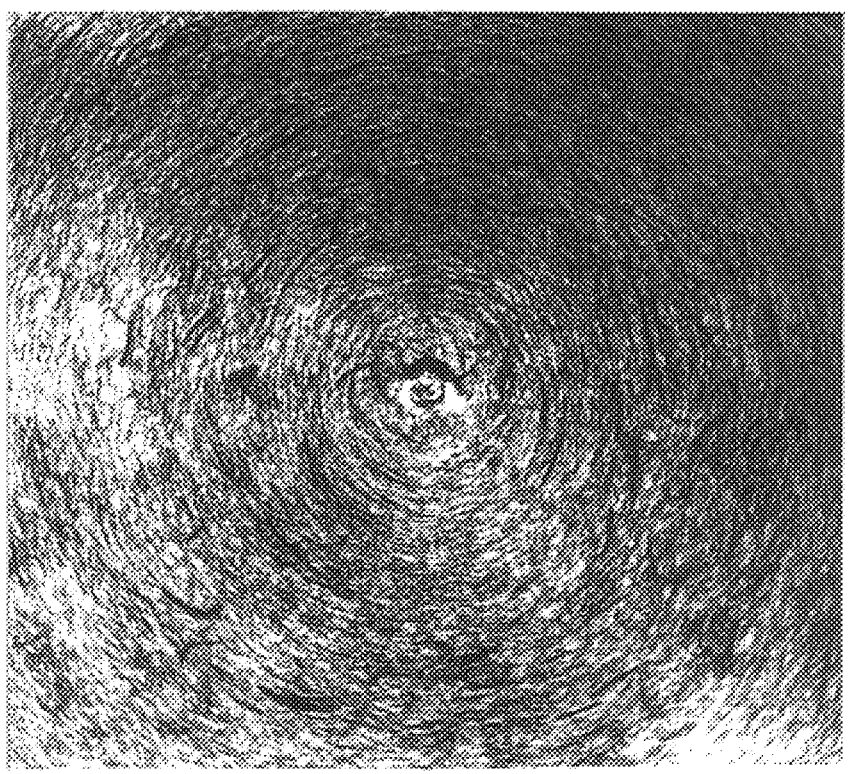
FIG. 1B is a soft X-ray photograph of an injection molded flat sheet obtained from a conventional fiber-reinforced resin composition.

FIGS. 1A and 1B are copies of typical photographs showing the state of the long fibers practically dispersed in the molded article. FIG. 1A is a soft X-ray photograph of a molded article produced from a composition of the invention that is classified as good in dispersibility. FIG. 1B is a soft X-ray photograph of a molded article produced from a composition of each comparative example that is classified as bad or a little bad in dispersibility.

(2) Tensile strength

The tensile strength was measured in accordance with JIS K-7113. In this test, a specimen of JIS No. 1 was used.

(3) Repeated impact resistance properties

An Izod test specimen described in JIS K-7110 was set on an Izod impact tester. To the specimen, a hammer of 40 kg was repeatedly brought down at an angle of 75 degrees until the specimen was broken, and the number of times of bringing the hammer down until the specimen was broken was counted.

(4) Resin flow starting temperature

Measuring apparatus: Shimazu flow tester CFT-500 type

Measuring method: uniform rate heating method

Measuring conditions: heating rate=3° C./min, load=100 kgf, L/D of die=10/0.5

(5) Confirmation of chemical linkage formation

As for the resin diluent pellets (B), whether the chemical linkage was formed or not was ascertained by a boiling xylene extraction method. That is, the sample pellets of 5 g were extracted with boiling xylene and the extraction residue was measured. Judgment of the chemical linkage formation was made based on the following two criteria. The mixing ratio of the polyamide resin described below means a value expressed by (b2)/{(b1)+(b2)}.

No chemical linkage exists: when the residue is almost the same as the mixing ratio of the polyamide resin.

Chemical linkage exists: when the residue is larger than the mixing ratio of the polyamide resin by not less than 10% by weight.

Example 1–4, Comparative Examples 1 and 2

Into a crosshead die equipped on the tip of an extruder, a molten polyamide resin (a1) as a resin matrix and a glass long fiber roving as a long fiber reinforcement (a2) were introduced to produce strands by pultrusion in which the fiber bundle of the roving was loosened into fibers and the fibers were impregnated with the molten resin in the die. The strands were cut into pellets having a mean length shown in the following tables, to obtain long fiber-reinforced pellets. The long fiber-reinforced pellets (A) thus obtained were master batch pellets (A) wherein 80% by weight of the glass long fibers were contained in PA 6.

In the above preparation of the master batch pellets (A), PA 6 (trade name: CM1007, available from Toray Industries, Inc.) was used as the polyamide resin (a1), and a glass long fiber roving (a2) (mean single fiber diameter: 17 $\mu$m, number of filaments in a strand: 4,000, tex yarn number count: 2,310 g/km, available from Nippon Electric Glass Co., Ltd.) was used as the long fiber reinforcement (a2).

Separately, into an extruder were introduced a modified propylene crystalline polymer (b11) obtained by graft reaction with maleic anhydride (b12) (amounts of maleic anhydride units: 0.3% by weight (=0.06 meq)) and the aforementioned PA 6 (b2) in a given ratio shown in the following tables, and they were melt kneaded in the extruder at 250° C. to substantially form a chemical linkage therebetween, so as to obtain a polymer-alloyed resin diluent (B). The resin diluent (B) was extruded and cut into a given length. Thus, glass long fiber-reinforced pellets (mean length: 3 mm) were prepared.

Then, 50% by weight of the former and 50% by weight of the latter were dry blended, and the blend was injection molded at a temperature of 250° C. by means of an injection molding machine (L/D: 20, compression ratio: 1.8), to prepare flat sheets and other various test pieces (specimens). The results are set forth in Table 1.

Examples 5 and 6, Comparative Examples 3–8

A final composition (C) was prepared in the same manner as in Example 1 except that the amounts of the polyamide resin (a1) used as the resin matrix and the glass long fiber reinforcement used as the fiber reinforcement (a2) in the resin master batch (A) reinforced with the glass long fiber reinforcement (a2), the mean length of the master batch pellets, the ratio of the polyamide resin (b2) to the crystalline polypropylene resin [(b1)+(b11)] in the polymer alloy diluent (B), and the mixing ratio between the resin master batch (A) and the polymer alloy diluent (B) were varied to those shown in the following tables. The final composition (C) was molded into specimens in the same manner as in Example 1, which were evaluated in the same manner as in Example 1. The results are set forth in Table 2, though only the results in Comparative Example 8 are set forth in Table 3.

Example 7

Into an extruder were introduced 10% by weight of the modified propylene crystalline polymer (b11) obtained by graft reaction with maleic anhydride, 20% by weight of a unmodified polypropylene resin (b1) and 70% by weight of the same PA 6 (b2) as used in Example 1, and they were melt kneaded in the extruder, to obtain a polymer-alloyed resin diluent (B). A final composition (C) was prepared in the same manner as in Example 1 except that the polymer-alloyed resin diluent (B) was used in the form of pellets. The final composition (C) was molded into specimens in the same manner as in Example 1, which were evaluated in the same manner as in Example 1. The results are set forth in Table 3.

Example 8

Specimens were prepared in the same manner as in Example 1 except that both the resin master batch (A) reinforced with the long fibers and the polymer-alloyed resin diluent pellets (B) were prepared by the use of PA 66 (trade name: CM3007, available from Toray Industries, Inc.) as the polyamide resin (a1). The specimens were evaluated in the same manner as in Example 1. The results are set forth in Table 3.

Comparative Example 9

Into an extruder having a first hopper as an ordinary hopper and a second hopper which was provided on the barrel in order to feed a filler, a mixture of a modified propylene crystalline polymer (b11) obtained by graft reaction with maleic anhydride and the same PA 6 (a1) as used in Example 1 [mixing ratio: 22/78 (the former/the latter, % by weight)] was introduced through the first hopper.

Through the second hopper, chopped glass strands (mean single fiber diameter: 13 μm, mean length of chopped strands: 3 mm, available from Nippon Electric Glass Co., Ltd.) were introduced. The contents in the extruder were melt kneaded and extruded into strands. The strands were then cut to obtain reinforced pellets having a mean length of 3.5 mm (containing 40% by weight of the glass fiber reinforcement).

The mean length of the fiber reinforcement remaining in the reinforced pellets was measured, and it was 0.88 mm. Using the reinforced pellets, specimens were prepared in the same manner as in Example 1 except that the pellets were not subjected to dilution with a diluent. The specimens were evaluated in the same manner as in Example 1. The results are set forth in Table 3.

Comparative Example 10

Into the same extruder as used in Comparative Example 9, the same PA 6 (a1) as used in Example 1 was introduced through the first hopper and the same chopped glass strands (a2) as used in Comparative Example 9 were introduced through the second hopper. The contents in the extruder were melt kneaded and extruded into strands. The composite strands thus obtained were cut to prepare master batch pellets (A) having a mean length of 3.5 mm. These master batch pellets (A) were polyamide resin (a1) pellets containing 60% by weight of the glass fiber reinforcement.

The mean length of the fiber reinforcement remaining in the master batch pellets (A) was measured, and it was 0.85 mm. Then, 65% by weight of the master batch pellets (A) and 33% by weight of the same diluent pellets (B), as used in Example 1, were dry blended, and the amount of the glass fiber reinforcement in the final composition (C) and the amount of the crystalline polypropylene resin [(b1)+(b2)] in the final resin component were adjusted to the same values as in Comparative Example 9. The final composition (C) thus obtained was injection molded in the same manner as in Example 1 to prepare flat sheets and other various test pieces (specimens), which were evaluated in the same manner as in Example 1. The results are set forth in Table 3.

[View on the experimental results]

In Examples 1 to 8 according to the invention, the dispersibility of the fiber reinforcement (a2) in the resulting molded articles was good, and the molded articles were excellent in repeated impact resistance properties as well as in tensile strength (see: Tables 1, 2 and 3).

In Comparative Example 1, the ratio of the modified propylene crystalline polymer (b11) to the resin diluent (B) was too small, and also the amount of the modified propylene crystalline polymer (b11) contained in the final composition (C) was too small. The molded articles were poor in repeated impact resistance properties, though tensile strength thereof was improved (see: Table 1).

In Comparative Example 2, the ratio of the modified propylene crystalline polymer (b11) to the resin diluent (B) was too large, and the resulting molded articles were unsatisfactory in both tensile strength and repeated impact properties (see: Table 1).

In Comparative Example 3, only the modified propylene crystalline polymer (b1) (not polymer-alloyed) was used as the resin diluent (B), and the resin diluent (B) having a melting point lower than that of the first thermoplastic resin (A) was combined with the resin (A). Though the final composition had a component ratio within the range defined by the invention, the resulting molded articles were unsatisfactory in both tensile strength and repeated impact resistance properties (see: Table 2).

In Comparative Example 4, a master batch (A) of a long fiber-reinforced resin was prepared by the use of the modified propylene crystalline polymer (b11) as the resin matrix (a1), and to the master batch (A) was added a polyamide resin (b2) as the diluent (B). Though the final composition (C) had a component ratio within the range defined by the invention, the resulting molded articles were not improved at all in both tensile strength and repeated impact resistance properties (see: Table 2).

In Comparative Example 5, the pellet length of the master batch (A) was too long. In the hopper of the molding machine, separation between the master batch pellets (A) of the long fiber-reinforced resin and the resin diluent (B) took place, and hence there was found large variability among the resulting molded articles, that is, molded articles of uniform quality were not obtained (see: Table 2).

In Comparative Example 6, the amount of the glass long fiber reinforcement (a2) contained in the final composition (C) was too small, and resulting molded articles were poor in each of tensile strength and repeated impact strength (see: Table 2).

In Comparative Example 7, the amount of the glass fiber reinforcement (a2) contained in the final composition (C) was too large. Though the resulting molded articles showed high tensile strength, they were low in repeated impact strength because the amount of the modified propylene crystalline polymer (b11) in the final composition (C) was too small (see: Table 2).

In Comparative Example 8, the long fiber-reinforced resin was prepared by using, as a matrix (=master batch (A)), a polymer alloy resin obtained by melt kneading PA 6 (a1) and the modified propylene crystalline polymer (b11) prepared by the graft reaction with maleic anhydride. In this example, any resin diluent (B) was not used. Though the component ratio of the final composition was within the range defined by the invention, the dispersibility of the fiber reinforcement (a2) in the molded articles was poor, and the molded articles did not exhibit tensile sought (see: Table 3).

In Comparative Example 9, the specimens were prepared by the use of the same matrix as in Comparative Example 8 except for using short fibers as the glass fiber reinforcement. The specimens were inferior to the specimens prepared from the final composition (C) of the invention in each of tensile strength and repeated impact resistance properties (see: Table 3).

In Comparative Example 10, the polymer-alloyed specific resin diluent (B) according to the invention was added to the master batch (A) obtained by the use of short fibers as the fiber reinforcement. However, the resulting specimens were not improved at all in each of the tensile strength and the repeated impact strength as compared with those of Comparative Example 9 (see: Table 3).

TABLE 1

| Experiment No. | Example | | | | Comparative Example | |
|---|---|---|---|---|---|---|
| Content of Experiment | 1 | 2 | 3 | 4 | 1 | 2 |
| Amount of GF in final composition (wt %) | 40 | 40 | 40 | 40 | 40 | 40 |
| Amount of PP in final resin (wt %) | 25 | 33 | 33 | 33 | 13 | 42 |
| Ratio of master batch (A) (wt %) | 50 | 50 | 50 | 50 | 50 | 50 |
| (a1) Matrix resin (wt %) | PA6 20 | PA6 20 | PA6 20 | PA6 20 | PA6 20 | PA6 20 |
| (a2) GF (Amount (wt %) | 80 | 80 | 80 | 80 | 80 | 80 |
| (Mean length (mm) | 10 | 10 | 6 | 25 | 10 | 10 |
| Ratio of resin diluent (B) (wt %) | 50 | 50 | 50 | 50 | 50 | 50 |
| PP [(b1) + (b11)] ratio (wt %) | 30 | 40 | 40 | 40 | 15 | 50 |
| PA (b2) ratio (wt %) | 70 | 60 | 60 | 60 | 85 | 50 |
| Polymer-alloying (exist or not) | exist | exist | exist | exist | exist | exist |
| Flow starting temperature (°C.) | | | | | | |
| ((a1) | 236 | 236 | 236 | 236 | 236 | 236 |
| ((B) | 236 | 236 | 236 | 236 | 236 | 181 |
| Fiber dispersibility in molded article (–) | AA | AA | AA | AA | AA | AA |
| Tensile strength of molded article (MPa) | 274 | 272 | 270 | 275 | 279 | 193 |
| Repeated impact resistance property of molded article (number of times) | 144 | 123 | 105 | 141 | 32 | 31 |

GF: glass fiber reinforcement

TABLE 2

| Experiment No. | Example | | Comparative Example | | | | |
|---|---|---|---|---|---|---|---|
| Content of Experiment | 5 | 6 | 3 | 4 | 5 | 6 | 7 |
| Amount of GF in final composition (wt %) | 15 | 56 | 40 | 42 | 40 | 5 | 70 |
| Amount of PP in final resin (wt %) | 29 | 27 | 33 | 31 | 33 | 35 | 17 |
| Ratio of master batch (A) (wt %) | 38 | 70 | 80 | 60 | 50 | 17 | 87 |
| (a1) Matrix resin (wt %) | PA6 60 | PA6 20 | PA6 50 | PA6 30 | PA6 20 | PA6 70 | PA6 20 |
| (a2) GF (Amount (wt %) | 40 | 80 | 50 | 70 | 80 | 30 | 80 |
| (Mean length (mm) | 10 | 10 | 10 | 10 | 35 | 10 | 10 |
| Ratio of resin diluent (B) (wt %) | 62 | 30 | 20 | 40 | 50 | 83 | 13 |
| PP [(b1) + (b11)] ratio (wt %) | 40 | 40 | 100 | — | 40 | 40 | 40 |
| PA (b2) ratio (wt %) | 60 | 60 | — | 100 | 60 | 60 | 60 |
| Polymer-alloying (exist or not) | exist | exist | not | not | exist | exist | exist |
| Flow starting temperature (°C.) | | | | | | | |
| ((a1) | 236 | 236 | 236 | 181 | 236 | 236 | 236 |
| (B) | 236 | 236 | 181 | 236 | 236 | 236 | 236 |
| Fiber dispersibility in molded article (–) | AA | AA | AA | AA | AA | AA | AA |
| Tensile strength of molded article (MPa) | 149 | 284 | 200 | 159 | — | 52 | 271 |
| Repeated impact resistance property of molded article (number of times) | 74 | 147 | 12 | 10 | — | 1 | 43 |

GF: glass fiber reinforcement

TABLE 3

| Experiment No. | Example | | Comparative Example | | |
|---|---|---|---|---|---|
| Content of Experiment | 7 | 8 | 8 | 9 | 10 |
| Amount of GF in final composition (wt %) | 40 | 40 | 40 | 40 | 40 |
| Amount of PP in final resin (wt %) | 25 | 33 | 33 | 22 | 22 |
| Ratio of master batch (A) (wt %) | 50 | 50 | 100 | 100 (short) | 67 (short) |
| (a1) Matrix resin (wt %) | PA6 20 | PA66 20 | PA6, MPP ALY 60 | PA6, MPP ALY 60 | PA6 40 |
| (a2) GF (Amount (wt %) | 80 | 80 | 40 | 40 | 60 |
| (Mean length (mm) | 10 | 10 | 10 | 0.88 | 0.85 |
| Ratio of resin diluent (B) (wt %) | 50 | 50 | — | — | 33 |
| PP [(b1) + (b11)] ratio (wt %) | 30 | 40 | — | — | 40 |
| PA (b2) ratio (wt %) | 70 | 60 | — | — | 60 |
| Polymer-alloying (exist or not) | exist | exist | not exist | not exist | exist |
| Flow starting temperature (°C.) | | | | | |
| ((a1) | 236 | 277 | 236 | 236 | 236 |
| ((B) | 236 | 277 | — | — | 236 |
| Fiber dispersibility in molded article (–) | AA | AA | BB | AA | AA |
| Tensile strength of molded article (MPa) | 273 | 271 | 167 | 153 | 155 |
| Repeated impact resistance property of molded article (number of times) | 138 | 125 | 42 | 3 | 2 |

GF: glass fiber reinforcement
ALY: polymer alloy
MPP: modified propylene polymer
Short: short fiber reinforcement

EFFECT OF THE INVENTION

The effects of the long fiber-reinforced resin composition (C) according to the present invention are described below.

(1) The long fiber reinforcement exhibits high dispersibility in the molded article, and hence the molded article is prominently good in both tensile strength and repeated impact strength.

(2) Because of its excellent mechanical strength and repeated impact resistance properties, the long fiber-reinforced resin composition (C) of the invention can be favorably used for various industrial parts such as vehicle parts (e.g., automobile parts such as bumpers, wheel caps and under covers, impellers of outdoor fans or cooling towers, and electric power tool parts.

(3) According to the injection molding method, the effects sought for the invention, that is, uniform dispersibility of the long fibers in the molded article and improvements in tensile strength and repeated impact resistance properties (impact times in the durability test) of the molded article can be all realized to a high degree.

What is claimed is:

1. A long fiber-reinforced polymer alloy resin composition (C) obtained by blending:

a master batch (A) comprising a long fiber reinforcement (a2) having a length of 3 to 30 mm in a resin matrix (a1) comprising a polyamide resin, and a substantially polymer-alloyed resin diluent (B) obtained by melt kneading 20 to 45% by weight of a crystalline polyolefin resin (b1), said crystalline polyolefin resin (b1) comprising a modified olefin crystalline polymer (b11) having been substantially modified with unsaturated carboxylic acids, and 55 to 80% by weight of a polyamide resin (b2);

in which the amount of the long fiber reinforcement (a2) is in the range of 10 to 60% by weight, and the amount of the crystalline polyolefin resin (b1) in other resin components ((a1)+(b1)+(b2)) than the long fiber reinforcement (a2) is in the range of 20 to 45% by weight.

2. The long fiber-reinforced polymer alloy resin composition (C) as claimed in claim 1, wherein the resin diluent (B) comprises 60 to 75% by weight of the polyamide resin (b2) and 25 to 40% by weight of the crystalline polyolefin resin (b1), the total amounts of said components (b1) and (b2) being 100% by weight.

3. The long fiber-reinforced polymer alloy resin composition (C) as claimed in claim 1, wherein the long fiber reinforcement (a2) includes at least one inorganic fiber selected from the group consisting of a glass fiber, rock wool, a metallic fiber and a carbon fiber, and/or at least one fiber selected from the group consisting of all aromatic polyamide fibers and all aromatic polyester fibers.

4. The long fiber-reinforced polymer alloy resin composition (C) as claimed in claim 1, wherein the long fiber reinforcement (a2) includes a glass fiber.

5. The long fiber-reinforced polymer alloy resin composition (C) as claimed in claim 1, wherein the resin diluent (B) comprises 60 to 75% by weight of the polyamide resin (b2) and 25 to 40% by weight of a crystalline polypropylene resin (b1) containing a modified propylene crystalline polymer (b11), the total amounts of said components (b1) and (b2) being 100% by weight.

6. The long fiber-reinforced polymer alloy resin composition (C) as claimed in claim 1, wherein said master batch (A) and said substantially polymer-alloyed resin diluent (B) are in the form of a pellet.

7. The long fiber-reinforced polymer alloy resin composition (C) as claimed in claim 6, wherein said master batch (A) is formed by pelletizing a bundle of continuous reinforcements impregnated with said resin matrix (a1) and the resultant pellet has a length equal to that of the long fiber reinforcement (a2).

8. The long fiber-reinforced polymer alloy resin composition (C) as claimed in claim 1, wherein said master batch (A) is in the form of a pellet and is coated with said substantially polymer-alloyed resin diluent (B).

9. The long fiber-reinforced polymer alloy resin composition (C) as claimed in claim 8, wherein said master batch (A) is formed by pelletizing a bundle of continuous reinforcements impregnated with said resin matrix (a1) and the resultant pellet has a length substantially equal to that of the long fiber reinforcement (a2).

* * * * *